United States Patent [19]
Wilson

[11] 3,789,590
[45] Feb. 5, 1974

[54] POWER RAKE

[76] Inventor: Elinor M. Wilson, 4137 Holmes, Kansas City, Mo. 64110

[22] Filed: Aug. 7, 1972

[21] Appl. No.: 278,563

[52] U.S. Cl............. 56/14.7, 56/16.7, 56/344, 15/79
[51] Int. Cl............................................ A01d 51/00
[58] Field of Search 15/78, 79, 93 R; 56/14.7, 16.4, 56/16.6, 16.7, 31, 32, 30, 12.8, 202, 199, 344

[56] References Cited
UNITED STATES PATENTS

| | | | |
|---|---|---|---|
| 3,125,844 | 3/1964 | Beyer | 56/16.4 |
| 1,020,838 | 3/1912 | Neer | 56/32 |
| 2,749,564 | 6/1956 | Tally | 15/79 |
| 2,525,090 | 10/1950 | Bott | 56/16.6 |
| 3,545,187 | 12/1970 | Whitney | 56/16.7 |
| 2,417,613 | 3/1947 | Radabaugh | 56/11.9 X |
| 2,918,694 | 12/1959 | Tarrant | 56/202 X |
| 3,199,277 | 8/1965 | Moody | 56/16.6 |
| 3,408,801 | 11/1968 | Kroll | 56/199 |

*Primary Examiner*—Russell R. Kinsey
*Attorney, Agent, or Firm*—Fishburn, Gold & Litman

[57] ABSTRACT

A mobile power rake for use in lawns, gardens, and the like comprises a frame having a rake portion extending forwardly therefrom and a handle portion extending rearwardly from said frame and power driven ground engaging wheels rotatably mounted on the frame and in vertical spaced relation below the rake portion and a roller mounted on and in depending relation to the handle portion and spaced rearwardly from the wheels and in vertical spaced relation above the wheels whereby the rake portion is spaced above a ground surface when the roller is in engagement with the ground surface. A material receiving receptacle is mounted on the frame and has an entrance adjacent the rake portion for receiving debris from the rake portion.

5 Claims, 10 Drawing Figures

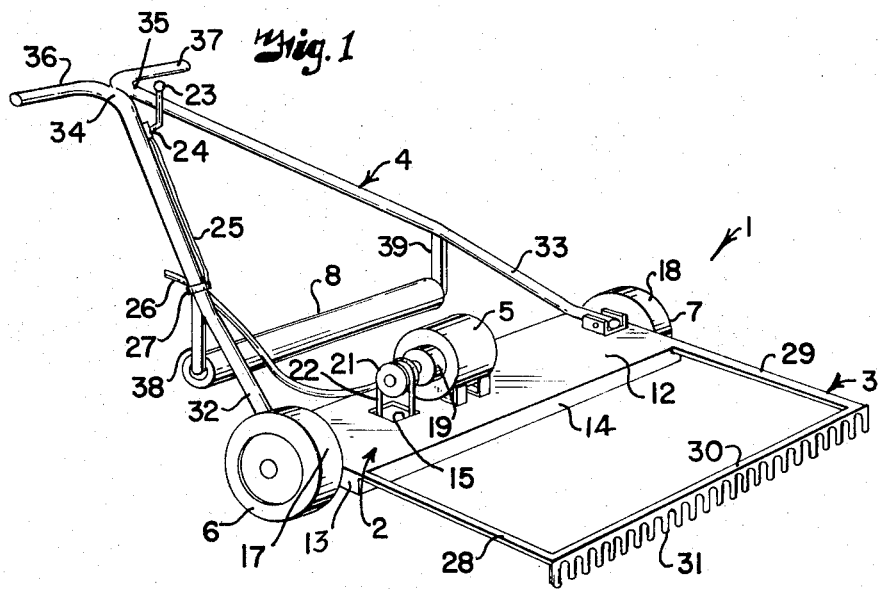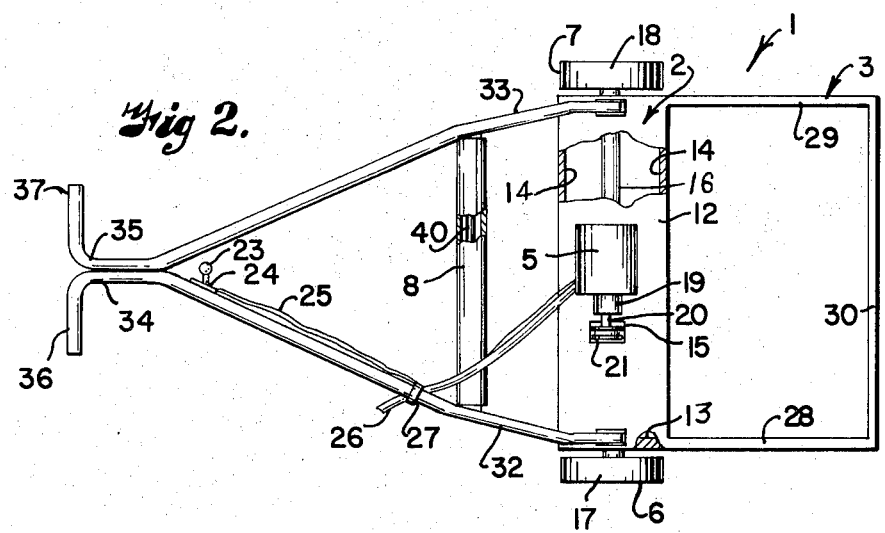

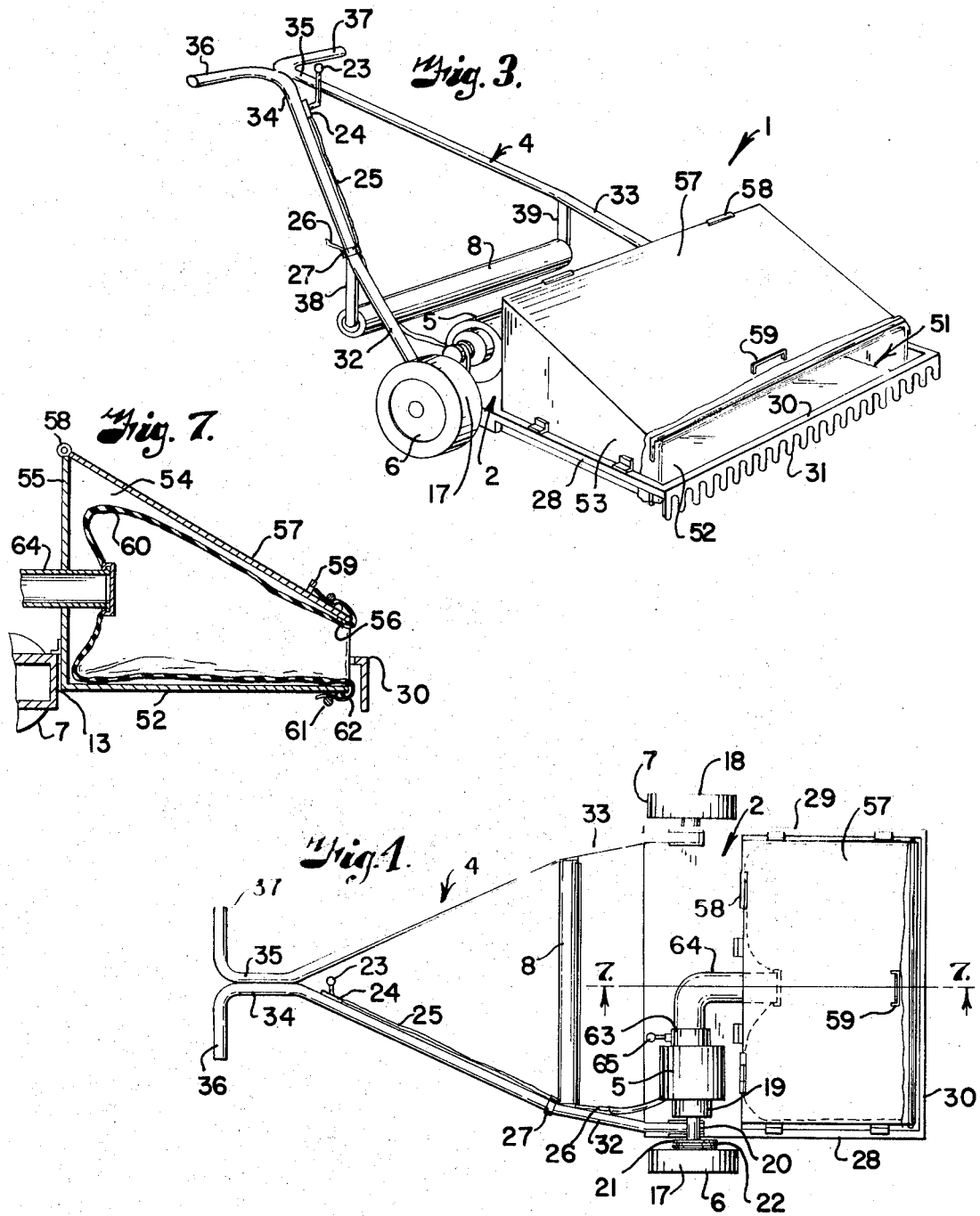

POWER RAKE

The present invention relates to rakes and more particularly to a mobile power rake for use in lawns, gardens and the like.

The principal objects of the present invention are: to provide a self-propelled power rake for individual use in lawns, gardens, and the like and having desirable features not available in other rakes; to provide such a self-propelled power rake which is easy to control and requires only guiding when in operation; to provide such a power rake for cleaning lawns, gardens, flowerbeds, and the like and which removes weeks, dead grass, lawn-cuttings, leaves, debris, and the like even after same have become matted and heavy with moisture; to provide such a power rake which is adapted to prepare soil for seeding and for a garden and which is particularly well adapted to break up soil and smooth and level same; to provide such a power rake having a material receiving receptacle with means operatively connected thereto for effecting a flow of air into the receptacle thereby moving debris thereinto and having changeable inserts or containers adapted to be removably mounted within the receptacle; and to provide such a self-propelled power rake which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features of the power rake.

FIG. 1 is a perspective view of a power rake embodying features of the present invention.

FIG. 2 is a top plan view of the power rake.

FIG. 3 is a perspective view of a power rake having material receiving means thereon.

FIG. 4 is a top plan view of the power rake having material receiving means thereon.

FIG. 7 is an enlarged fragmentary longitudinal sectional view taken on line 7—7, FIG. 4 and showing details of the material receiving means.

Figure 5:
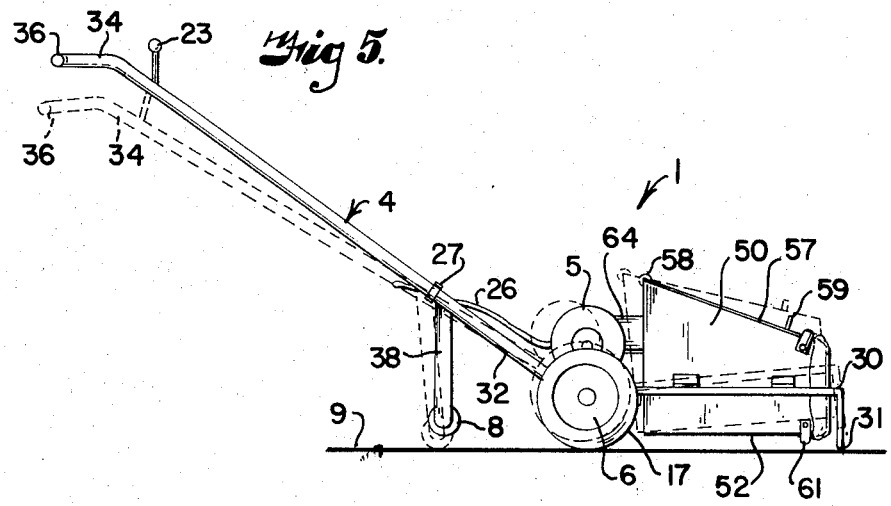
FIG. 5 is a side elevational view of the power rake having material receiving means thereon and showing an alternate position in broken lines.
Figure 6:
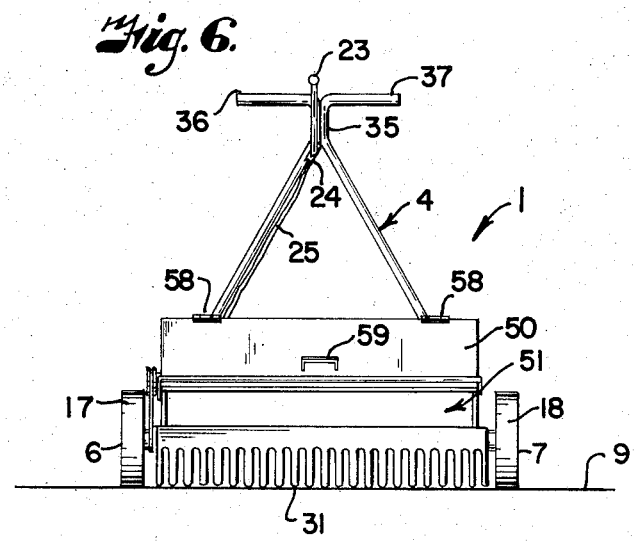
FIG. 6 is a front elevational view of the power rake having material receiving means thereon.

Referring more in detail to the drawings:

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting but merely as the basis for the claims and as a representative basis for teaching one skilled in the art to variously employ the present invention in virtually any appropriate detailed structure.

In the disclosed embodiment of the present invention, the reference numeral 1 generally designates a mobile and self-propelled power rake for use in lawns, gardens, and the like. The mobile power rake 1 includes a frame 2 having a rake portion 3 extending forwardly from the frame 2 and a handle portion 4 extending rearwardly from the frame 2 and a motor 5 mounted on the frame 2 and operatively connected to ground engaging wheels 6 and 7 which are rotatably mounted on the frame 2 and in vertical spaced relation below the rake portion 3 and the handle portion 4 and a roller 8 mounted on and in depending relation to the handle portion 4 and spaced rearwardly from the wheels 6 and 7 and in vertical spaced relation above a ground engaging surface of each of the wheels 6 and 7 whereby the rake portion 3 is spaced above a ground surface 9 when the roller 8 is in engagement with the ground surface 9.

The frame 2 may be any desired construction which is suitable to support the rake portion 3, handle portion 4, motor 5, and the wheels 6 and 7. In the illustrated structure, the frame 2 is generally rectangular and has a planar top member 12 with laterally spaced side portions 14 and longitudinally spaced end portions 13 each depending from the top member 12 thereby defining the periphery of the frame 2. The top member 12 has an opening 15 therein, for a purpose later described.

The wheels 6 and 7 provide first ground engaging means and may be rotatably mounted on the frame 2 in any suitable manner and the wheels 6 and 7 may be driven by any suitable power means. In the illustrated structure, an axle 16 is positioned below the top member 12 and has the opposite end portions thereof extending through the respective end portions 14 and suitably rotatably supported thereon, as in suitable bearings (not shown). The wheels 6 and 7 are suitably secured to respective opposite end portions of the axle 16 and are preferably spaced from respective end portions 14 of the frame 2. The wheels 6 and 7 have peripheral ground engaging surfaces 17 and 18 respectively, which are adapted to effect movement of the power rake 1 along the ground surface 9.

The motor 5 may be any suitable unit adapted to drive the wheels 6 and 7, however, the motor 5 is preferably an electric reversible motor and has a suitable gear reduction unit 19 operatively connected thereto and which is operative to effect rotation of a driven shaft 20 extending from the gear reduction unit 19. The driven shaft 20 is operatively connected to the axle 16 by suitable motion transmitting means to thereby effect rotation of the axle 16 and the wheels 6 and 7.

In the illustrated structure, a suitable pulley 21 is mounted on the driven shaft 20 and a suitable endless belt 22 is in operative engagement with the pulley 21 on the driven shaft 20 and a suitable pulley (not shown) secured on the axle 16 whereby the operation of the motor 5 effects rotation of the wheels 6 and 7.

It is preferable to control operation of the motor 5, therefore, a suitable lever 23 is supported on the handle portion 4 and is operatively connected to the motor 5 for selecting the direction of rotation of the driven shaft 20. The lever 23 is mounted on a suitable housing 24 having therein a suitable switch (not shown) electrically connected, as by a cord 25, to the motor 5.

The lever 23 preferably has an "off" position, a forward position, a neutral position, and a reverse position to thereby select the direction of travel of the power rake 1.

The illustrated motor 5 is electrically connected to a suitable source of electrical power, such as 120 v. house current, as by a cord 26. It is desirable to support and retain the cords 25 and 26 in a position above the wheels 6 and 7 and above the roller 8, therefore, a suitable cord support 27 is mounted on the handle portion 4 and the cords 25 and 26 extend therethrough.

The rake portion 3 extends forwardly from the frame 2 and may be of any suitable construction adapted to clean lawns, gardens, and the like and to prepare soil for seeding and for gardens. The rake portion 3 is illustrated as a generally U-shaped member having arms 28 and 29 extending forwardly from respective ends of the frame 2 and having a connecting member 30 extending between forward ends of the arms 28 and 29. The connecting member 30 has a plurality of spaced teeth or tines 31 depending therefrom and adapted to engage the ground surface 9 and move debris, such as dead grass, weeds, grass-cuttings, leaves, and the like, along the ground surface 9 when the power rake 1 is moved thereover.

The rake portion 3 is preferably fixedly mounted on the frame 2, however, rear ends of the arms 28 and 29 may be removably mounted on the frame 2 whereby a plurality of types of rake portions may be provided and used with the mobile power rake 1 as interchangeable attachments therefor and including rake portions having substantially rigid teeth or tines, flexible tines, blade-like teeth or tines, curved tines, straight tines, and the like.

The handle portion 4 is suitably secured to the frame 2 and extends generally rearwardly therefrom. The handle portion 4 may be any desired configuration, however, in the illustrated structure, a pair of arms 32 and 33 each have one end thereof secured to the frame 2 and positioned adjacent a respective opposite end of the frame 2 and the illustrated arms 32 and 33 are upperwardly and rearwardly converging and have upper end portions 34 and 35 in facing engagement and suitably secured together, as by bolts. The illustrated handle portion 4 includes gripping portions 36 and 37 extending laterally outwardly from the end portions 34 and 35 respectively and adapted to be held by the hands of an operator (not shown).

The roller 8 provides second ground engaging means and may be in the form illustrated or the second ground engaging means may be a single wheel or a pair of spaced wheels.

The roller 8 is illustrated as an elongated tubular member rotatably supported on a generally U-shaped member mounted on and depending from the handle portion 4 and in the illustrated structure, the U-shaped member is defined by generally upright portions 38 and 39 having the upper ends thereof suitably secured to the arms 32 and 33 respectively, as by welding, and an axle portion 40 extending between lower ends of the upright portions 38 and 39 and the roller 8 is sleeved thereon. It is preferable to provide suitable bearings (not shown) within the tubular roller 8 and in engagement with the axle portion 40 thereby rotatably supporting the roller 8 on the axle portion 40.

In using a power rake constructed as illustrated and described, the power rake 1 is moved to a desired location either by operation of the motor 5 and the wheels 6 and 7 or first ground engaging means or by tilting the power rake 1 such that the weight thereof is supported on the roller 8 or second ground engaging means during movement of the power rake 1 to the desired location. When the teeth or tines 31 of the selected rake portion 3 are in the desired location, the lever 23 is adjusted to effect closing of a suitable switch (not shown) and completion of a circuit to the motor 5 and thereby rotating the wheels 6 and 7 to effect reverse movement of the power rake 1. After the desired raking movement is completed, the lever 23 may be moved to a neutral position or to a forward position to permit the power rake 1 to be moved to the next desired location whereupon the lever 23 is again moved to a position effecting reverse movement of the power rake 1. An alternate method of using the power rake 1 is to position the lever 23 in a position effecting reverse rotation of the wheels 6 and 7 and depressing the handle portion 4 thereby placing the weight of the power rake 1 on the roller 8 and moving the ground engaging surfaces 17 and 18 of the wheels 6 and 7 out of engagement with the ground surface 9 thereby permitting maneuvering of the power rake 1 as desired as shown in broken lines in FIG. 5. The power rake 1 may be moved forwardly when supported on the roller 8 only and moved in the reverse direction by operation of the wheels 6 and 7 when the handle portion 4 is raised to permit the wheels 6 and 7 to engage the ground surface 9 and the teeth or tines 31 to engage the ground surface 9 to effect raking thereof.

FIGS. 3 to 7 inclusive illustrate an additional feature of the power rake 1 wherein a material receiving receptacle 50 is suitably mounted on the frame 2 and has an entrance 51 adjacent the rake portion 3 for receiving debris from the rake portion 3.

The illustrated receptacle 50 has a bottom wall 52 adapted to be adjacent the ground surface 9 when the teeth or tines 31 are in engagement with the ground surface 9. Opposed side walls 53 and 54 extend upwardly from the bottom wall 52 and have suitable means thereon for mounting on the arms 28 and 29 of the rake portion 3. A rear wall 55 extends upwardly from the bottom wall 52 and preferably has suitable means thereon for mounting on or connection to the top member 12 of the frame 2.

It is desirable that the debris moving through the entrance 51 be retained within the receptacle 50, therefore, a support or tie member 56 extends between forward ends of the side walls 53 and 54 and is positioned adjacent respective upper edges thereof. A lid 57 is mounted on the rear wall 55, as by suitable hinges 58, for movement between an open position and a position closing the receptacle 50. The illustrated lid 57 has side edges thereof engageable with respective upper edges of the side walls 53 and 54 and a forward edge engageable with the support or tie member 56 for supporting the lid 57 thereon. A handle 59 is mounted on the lid 57 and is adapted to be engaged by an operator of the power rake 1 for opening the receptacle 50 to permit removable of the debris therefrom.

It is desirable to provide a removable container 60 within the receptacle 50 for receiving and storing debris therein. The removable container 60 preferably has a shape corresponding to the shape of the interior of the receptacle 50 and has a cuff portion adapted to engage exterior surfaces of the bottom wall 52, side walls 53 and 54, and the support or tie member 56, whereby the lid 57 will engage same to hold the removable container 60 in position within the receptacle 50.

It is desirable to provide means to retain the cuff portion of the removable container 60 in engagement with the exterior surfaces of the bottom wall 52, side walls 53 and 54, and the support or tie member 56, therefore, a pair of keeper members 61 are pivotally mounted on the side walls 53 and 54 and the keeper members 61 are movable into engagement with the cuff portion of the removable container 60 and hold same in clamped engagement with respective portions of the receptacle 50.

In the illustrated embodiment, the exterior surfaces of the bottom wall 52 and the lid 57 each have an outwardly extending rib 62 thereon with the ribs 62 having a generally curved exterior surface and adapted to permit the respective keeper member 61 to move thereover to hold the cuff portion in engagement with the receptacle 50.

An inwardly directed flow of air has been found to be effective in moving debris from the teeth or tines 31 and into the removable container 60 within the receptacle 50. Therefore, a vacuum unit 63 is operatively connected to the motor 5 and a tubular member 64 extends from the vacuum unit 63 and through the rear wall 55 of the receptacle 50. The removable container 60 is adapted to be secured in position on an end of the tubular member 64 which preferably has a suitable screen or filter member (not shown) thereon to prevent debris from entering the vacuum unit 63.

It is desirable to selectively control operation of the vacuum unit 63, therefore, a suitable switch 65 is mounted on the vacuum unit 63 and operatively connected thereto for activating the vacuum unit 63 when the switch 65 is moved to an "on" position.

Using a power rake having the receptacle 50 thereon is substantially similar to using the power rake shown in FIGS. 1 and 2 except that debris dislodged by the teeth or tines 31 is moved into the receptacle 50 in response to an inwardly directed flow of air through the entrance 51 in response to activation of the vacuum unit 63 by the switch 65. Movement of the power rake having the receptacle 50 thereon is substantially similar to movement of the power rake illustrated in FIGS. 1 and 2 except that it will be preferable to use the lever 23 for effecting forward and reverse rotation of the wheels 6 and 7 after the receptacle 50 is substantially filled with debris and particularly debris which is matted and heavy with moisture.

Figure 8:
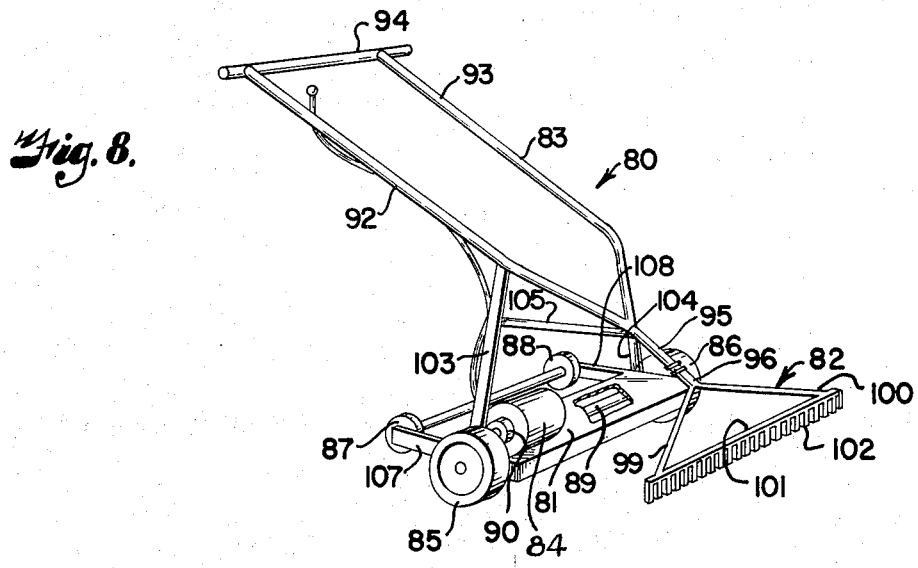
FIG. 8 is a perspective view of an other form of the power rake having a removable rake portion.
Figure 9:
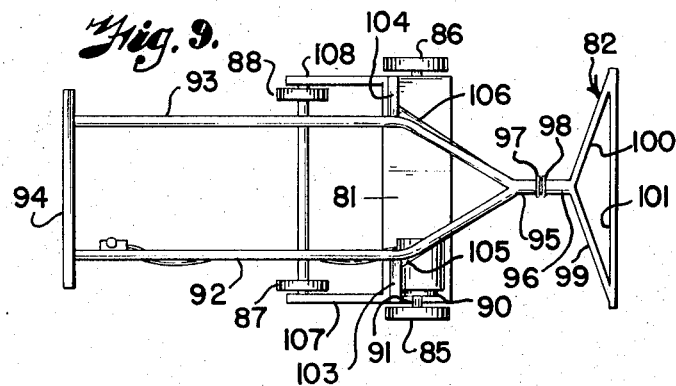
FIG. 9 is a top plan view of the power rake shown in FIG. 8.
Figure 10:
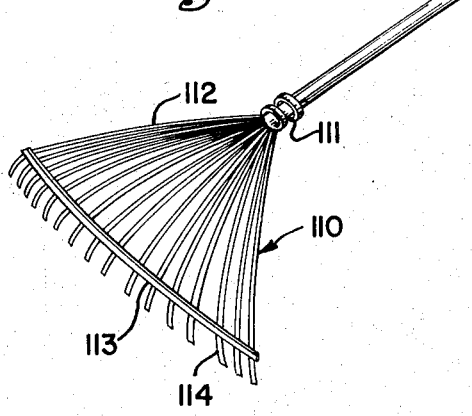
FIG. 10 is a fragmentary perspective view showing an other form of a removable rake portion.

FIGS. 8 to 10 inclusive, illustrate a modified power rake 80 which includes a frame 81 having a combined rake portion 82 and handle portion 83 supported on the frame 81. A motor 84 is mounted on the frame 81 and is operatively connected to ground engaging wheels 85 and 86 which are rotatably supported on the frame 81 and in vertical spaced relation below the rake portion 82. The modified power rake 80 includes a pair of rear wheels 87 and 88 supported on the frame 81 and spaced rearwardly from the wheels 85 and 86 respectively and in vertical spaced relation above the ground engaging surface of each of the wheels 85 and 86 whereby the rake portion 82 will be spaced above the ground surface 9 when the rear wheels 87 and 88 are in engagement with the ground surface 9.

The frame 81 is substantially similar to the frame 2 and rotatably supports an axle 89 having the ground engaging wheels 85 and 86 mounted on respective opposite end portions thereof.

The motor 84 is substantially similar to the motor 5 and has a suitable gear reduction unit 90 operatively connected thereto and which is operative to effect rotation of a driven shaft 91 extending from the gear reduction unit 90 and operatively connected to the axle 89 by suitable motion transmitting means to thereby effect rotation of the axle 89 and the ground engaging wheels 85 and 86.

The combined rake portion 82 and handle portion 83 is illustrated as having a bifurcated handle portion 83 defined by a pair of arms 92 and 93 which are laterally spaced and substantially parallel. Upper ends of the arms 92 and 93 are joined together by a bar 94 adapted to be held by a person using the modified power rake 80. Other or lower ends of the arms 92 and 93 are joined together and form a shaft 95 having the rake portion 82 removably mounted thereon.

The rake portion illustrated in FIGS. 8 and 9 includes a mounting portion 96 removably secured on an end of the shaft 95, as by a pair of clamps 97 and 98. A pair of arms 99 and 100 extend from the mounting portion 96 and have the forward ends thereof connected by a connecting member 101 extending therebetween to define a substantially rigid unit. The connecting member 101 has a plurality of spaced teeth or tines 102 depending therefrom and adapted to engage the ground surface 9 and move debris. It is preferable that the teeth or tines 102 be substantially rigid members.

The combined rake portion 82 and handle portion 83 is supported on the frame 81 and in the illustrated structure, a pair of standards 103 and 104 each have lower ends thereof suitably secured to the frame 81, as by welding, and upper ends suitably secured or connected to the arms 92 and 93 respectively, of the handle portion 83, as by welding. It is desirable that the connection between the handle portion 83 and the standards 103 and 104 be substantially rigid, therefore, suitable braces 105 and 106 extend between the standards 103 and 104 and the arms 92 and 93 respectively of the handle portion 83.

The rear wheels 87 and 88 are supported on the frame 81 in any suitable manner, such as a pair of arms 107 and 108 secured to and extending rearwardly from respective opposite ends of the frame 81 and having the respective wheels 87 and 88 rotatably mounted thereon.

FIGS. 10 illustrates another form of a removable rake portion 110 having a mounting portion 111 suitably mounted on the end of the shaft 95, as by the clips 97 and 98. The rake portion 110 has a plurality of flexible tines 12 connected to and diverging from the mounting portion 111. A tie-bar 113 is suitably secured to the flexible tines 112 adjacent forward ends thereof. In the illustrated structure, the flexible tines 112 each have arcuate end portions 114 extending forwardly from the tie-bar 113 and adapted to engage the ground surface 9.

It is to be understood that while I have illustrated and described certain forms of my invention, it is not to be limited to these specific forms or arrangement of parts herein described and shown.

I claim:
1. A power rake comprising:
   a. a frame;

b. a handle mounted on said frame and extending rearwardly therefrom;

c. a rake mounted on said frame and extending forwardly therefrom, said rake having a pair of spaced arms extending generally forwardly from said frame and a connecting member extending between said arms, said connecting member having a plurality of spaced tines depending therefrom;

d. first ground engaging means rotatably mounted on said frame and positioned between said handle and said rake, said first ground engaging means having ground engaging portions positioned in vertical spaced relation below said tines of said rake;

e. drive means mounted on said frame and operatively connected to said first ground engaging means for effecting rotation of said first ground engaging means; and f. second ground engaging means rotatably mounted on said handle, said second ground engaging means being spaced rearwardly of said first ground engaging means, said second ground engaging means having ground engaging portions positioned in vertical spaced relation above said ground engaging portions of said first ground engaging means whereby said rake is spaced from a ground surface when said ground engaging portions of said second ground engaging means is in engagement with the ground surface.

2. A power rake as set forth in claim 1 including:

a. material receiving means mounted on said frame and having an entrance adjacent said connecting member of said rake, said material receiving means having wall portions defining a receptacle and a lid hingedly mounted thereon;

b. means operatively connected to said material receiving means and to said drive means for effecting an inwardly directed flow of air into said material receiving means, said means for effecting an inwardly directed flow of air into said material receiving means including a vacuum unit and a tubular member extending between said vacuum unit and said receptacle;

c. a removable container mounted in said receptacle for receiving and storing debris, said container being adapted to be secured in position on an end of said tubular member, said container having portions engageable with the wall portions defining the receptacle adjacent the entrance thereto;

d. means on said receptacle removably engageable with said container for removably securing same in said receptacle; and e. contol means operatively connected to said vacuum unit for selectively activating same.

3. A power rake as set forth in claim 1 wherein:

a. said first ground engaging means comprises a plurality of supporting wheels each having a peripheral ground engaging surface; and b. said second ground engaging means comprises an elongated roller adapted to movably support the power rake when the peripheral ground engaging surface of each of said supporting wheels is spaced above the ground surface, said roller having a peripheral ground engaging surface positioned above the peripheral ground engaging surface of each of said supporting wheels when said rake is in operative position.

4. A power rake comprising:

a. a frame;

b. a handle mounted on said frame and extending rearwardly therefrom;

c. a rake mounted on said frame and extending forwardly therefrom and adapted to engage a ground surface, said rake having a pair of spaced arms extending generally fowardly from said frame and a connecting member extending between said arms, said connecting member having a plurality of spaced tines depending therefrom;

d. first ground engaging means rotatably mounted on said frame and positioned between said handle and said rake, said first ground engaging means having respective peripheral ground engaging surfaces positioned in vertical spaced relation below said tines, said frame being pivotally supported relative to said first ground engaging means;

e. reversible drive means mounted on said frame and operatively connected to said first ground engaging means for selectively effecting forward and reverse rotation of said first ground engaging means;

f. rotatably mounted second ground engaging means depending from said handle, said second ground engaging means having a peripheral ground engaging surface spaced rearwardly of said first ground engaging means, said second ground engaging means having the peripheral ground engaging surface thereof normally positioned in vertical spaced relation above the peripheral ground engaging surfaces of said first ground engaging means whereby said second ground engaging means is adapted to support the power rake when said first ground engaging means is spaced above the ground surface by downward pressure on said handle;

g. material receiving means mounted on said frame and having an entrance adjacent said connecting member of said rake, said material receiving means having wall portions defining a receptacle and a lid hingedly mounted thereon, said receptacle having a bottom wall adapted to be adjacent the ground surface when said rake is in engagement with the ground surface;

h. means operatively connected to said material receiving means and to said drive means for effecting an inwardly directed flow of air into said material receiving means, said means for effecting an inwardly directed flow of air into said material receiving means including a vacuum unit and a tubular member extending between said vacuum unit and said receptacle;

i. a removable container mounted in said receptacle for receiving and storing debris, said container being adapted to be secured in position on an end of said tubular member, said container having a cuff portion engageable with an exterior surface of the wall portions defining the receptacle adjacent the entrance thereto; and j. control means operatively connected to said drive means for selectively activating same and for activating said means for effecting an inwardly directed flow of air into said material receiving means.

5. A power rake as set forth in claim 4 wherein:

a. said receptacle has movable means mounted thereon for engagement with said container for removably securing same in said receptacle;

b. said lid and said bottom wall of said receptacle each have an outwardly extending rib thereon; and c. said ribs each have an exterior surface adapted to permit said movable means to move thereover to hold said cuff portion of said removable container in engagement with the exterior surface of the wall portions defining said receptacle.

* * * * *